United States Patent
Gupta et al.

(10) Patent No.: US 12,439,470 B2
(45) Date of Patent: Oct. 7, 2025

(54) SIGNALING MULTI-LINK DEVICE CAPABILITIES

(71) Applicant: Cisco Technology, Inc., San Jose, CA (US)

(72) Inventors: Binita Gupta, San Diego, CA (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 19/043,172

(22) Filed: Jan. 31, 2025

(65) Prior Publication Data

US 2025/0254751 A1 Aug. 7, 2025

Related U.S. Application Data

(60) Provisional application No. 63/549,267, filed on Feb. 2, 2024.

(51) Int. Cl.
| | |
|---|---|
| *H04W 76/25* | (2018.01) |
| *H04W 8/22* | (2009.01) |
| *H04W 76/15* | (2018.01) |

(52) U.S. Cl.
CPC .............. *H04W 76/25* (2018.02); *H04W 8/22* (2013.01); *H04W 76/15* (2018.02)

(58) Field of Classification Search
CPC ........ H04W 76/25; H04W 8/22; H04W 76/15
See application file for complete search history.

(56) References Cited

U.S. PATENT DOCUMENTS

| 12,113,880 B2 * | 10/2024 | Kim | H04L 67/303 |
|---|---|---|---|
| 2021/0029588 A1 * | 1/2021 | Cariou | H04W 40/244 |
| 2021/0144787 A1 * | 5/2021 | Kwon | H04W 72/23 |
| 2021/0392494 A1 * | 12/2021 | Huang | H04W 12/76 |

(Continued)

FOREIGN PATENT DOCUMENTS

WO    2023249296 A1    12/2023

OTHER PUBLICATIONS

IEEE P802.11 Wireless Lan Specification framework for TGbe (Year: 2020).*

(Continued)

*Primary Examiner* — Nizar N Sivji
(74) *Attorney, Agent, or Firm* — Merchant & Gould P.C.

(57) ABSTRACT

Signaling Multi-Link Device (MLD) capabilities is provided. Signaling MLD capabilities can comprise maintaining, by a non-Access Point (AP) Multi-Link Device (MLD), an association with an AP MLD, the association comprising one or more setup links between the non-AP MLD and the AP MLD, each setup link established between an affiliated non-AP station (STA) of the non-AP MLD and an affiliated AP of the AP MLD. To add a link, the non-AP MLD generates and transmits to the AP MLD a Link Reconfiguration Request frame comprising a Reconfiguration Multi-Link element with one or more subfields, including an Extended MLD Capabilities and Operations subfield, comprising data indicating MLD capabilities of the non-AP MLD. Responsive to receiving a Link Reconfiguration Response frame indicating a success from the AP MLD, the non-AP MLD adds the link to the one or more setup links of the association between the AP MLD and the non-AP MLD.

21 Claims, 10 Drawing Sheets

(56) References Cited

U.S. PATENT DOCUMENTS

| | | | | |
|---|---|---|---|---|
| 2022/0086627 A1* | 3/2022 | Montemurro | ........... | H04L 61/25 |
| 2023/0247703 A1* | 8/2023 | Huang | ................. | H04W 76/15 |
| | | | | 370/328 |
| 2023/0269807 A1* | 8/2023 | Guo | ....................... | H04W 48/14 |
| 2023/0379999 A1* | 11/2023 | Kim | ....................... | H04W 76/20 |
| 2025/0039930 A1* | 1/2025 | Lu | ......................... | H04W 76/15 |

OTHER PUBLICATIONS

Multi-Link Operation in IEEE 802.11be WLANs (Year: 2022).*

Mutli-Link Channel Access Schemes for IEEE 802.11be Extremely High Throughput (Year: 2022).*

IEEE P802.11 Wireless Lan Compendium of straw polls and potential changes to the Specification Framework Document (Year: 2020).*

LAN/MAN Standards Committee of the IEEE Computer Society IEEE P802.11be™/D5.0 and "Draft Standard for Information technology—Telecommunications and information exchange between systems Local metropolitan area networks—Specific requirements"; Nov. 2023 New York, NY (1045 pgs.).

PCT International Searching Authority; The International Search Report and Written Opinion for Application No. PCT/US2025/014167 mailed on May 20, 2025; 17 pages.

* cited by examiner

| 202 MLD MAC Address Present | 204 EML Capabilities Present | 206 MLD Capabilities and Operations Present | 208 Extended MLD Capabilities and Operations Present | 210 Reserved |
|---|---|---|---|---|
| 1 | 1 | 1 | 1 | 8 |

Bits:

| 302 Common Info Length | 304 MLD MAC Address | 306 EML Capabilities | 308 MLD Capabilities and Operations | 310 Extended MLD Capabilities and Operations |
|---|---|---|---|---|
| 1 | 0 or 6 | 0 or 2 | 0 or 2 | 0 or 2 |

Octets:

SIGNALING MULTI-LINK DEVICE CAPABILITIES

RELATED APPLICATION

Under provisions of 35 U.S.C. § 119(e), Applicant claims the benefit of and priority to U.S. Provisional Application No. 63/549,267, filed Feb. 2, 2024, the disclosure of which is incorporated herein by reference in its entirety.

TECHNICAL FIELD

The present disclosure relates generally to signaling Multi-Link Device (MLD) capabilities and particularly to signaling MLD capabilities when adding a link during link reconfiguration.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 2 is a block diagram of a Presence Bitmap subfield of a Reconfiguration Multi-Link element in accordance with aspects of the present disclosure.

FIG. 3 is a block diagram of a Common Info Field of the Reconfiguration Multi-Link element in accordance with aspects of the present disclosure.

DETAILED DESCRIPTION

Overview

Figure 1A:
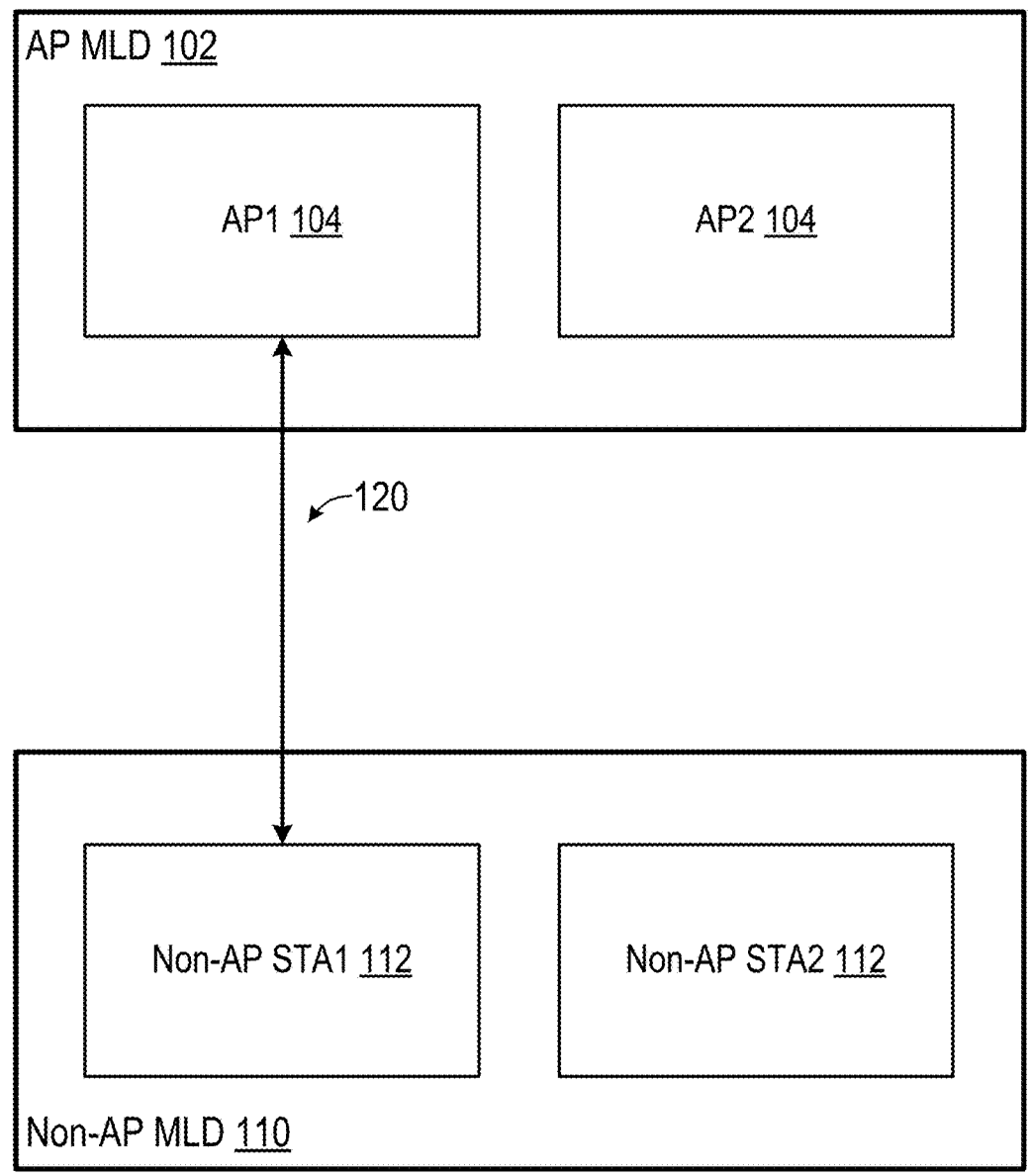
FIGS. 1A, 1B, 1C, 1D, and 1E collectively form FIG. 1, a block diagram of an operating environment for signaling Multi-Link Device (MLD) capabilities in accordance with aspects of the present disclosure.

Signaling Multi-Link Device (MLD) capabilities and, particularly, signaling MLD capabilities when adding a link during link reconfiguration may be provided. Signaling MLD capabilities can comprise maintaining, by a non-Access Point (AP) Multi-Link Device (MLD), an association with an AP MLD, the association comprising one or more setup links between the non-AP MLD and the AP MLD, each setup link established between an affiliated non-AP station (STA) of the non-AP MLD and an affiliated AP of the AP MLD. Responsive at least to an indication to add a first link to the one or more setup links of the association, the non-AP MLD generates a Link Reconfiguration Request frame comprising a Reconfiguration Multi-Link element, the Reconfiguration Multi-Link element including a Per-STA Profile subelement including data for a first affiliated non-AP STA corresponding to the first link that the non-AP MLD is requesting to add to the one or more setup links. The Reconfiguration Multi-Link element further comprises a MLD Capabilities and Operations subfield comprising data indicating a first set of capabilities of the non-AP MLD, and an Extended MLD Capabilities and Operations subfield comprising data indicating a second set of capabilities of the non-AP MLD. The non-AP MLD transmits the Link Reconfiguration Request frame to the AP MLD using a link of the one or more setup links and receives a Link Reconfiguration Response frame from the AP MLD. Responsive to the Link Reconfiguration Response frame indicating a success, the non-AP MLD adds the first link to the one or more setup links of the association between the AP MLD and the non-AP MLD.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The Institute of Electrical and Electronics Engineers (IEEE) 802.11be wireless networking standard details features related to implementing wireless communications at faster speeds and larger capacities, including Multi-Link Operation (MLO). MLO defines a set of procedures allowing communication over one or more links between MLDs.

Communication over links using different channels on different frequency bands or the same frequency band can occur simultaneously or not depending on the capabilities of both the Access Point (AP) MLD and the non-AP MLD (e.g., Simultaneous Transmit and Receive (STR) operation and Nonsimultaneous Transmit and Receive (NSTR) operation). Multiple Stations (STAs) may be affiliated with an MLD, and each affiliated STA can operate on a specific link. For example, an MLD may have affiliated STAs operating on different frequency bands or channels (e.g., an STA operating on 2.4 Gigahertz (GHz), an STA operating on 5 GHz, and an STA operating on 6 GHz), allowing the MLD to aggregate bandwidth and otherwise improve performance. Each STA affiliated with an MLD may select and manage its capabilities and operating parameters independently from other STAs affiliated with the same MLD. For example, each AP affiliated with an AP MLD can independently select, disable, and update MLD capabilities (e.g., capabilities and operating parameters), such as its Basic Service Set (BSS) color.

The MLO procedures allow a pair of MLDs to discover, synchronize, (de)authenticate, (re)associate, disassociate, and manage links and other resources with each other on any common bands or channels that are supported by both MLDs. Each MLD uses an MLD Medium Access Control (MAC) address that singly identifies the MLD and has a single MAC-Service AP (MAC-SAP). Each STA affiliated with an MLD has a MAC address different from any other STA affiliated with the same MLD.

During association or reassociation (i.e., (re)association), a non-AP STA MLD can request one or more links in the (Re)Association Request frame, and the AP STA MLD can accept the one or more links in the (Re)Association Response frame. The one or more links added during association or reassociation are setup links. MLD capabilities can be initially communicated during association or reassociation. Currently, the IEEE 802.11be standard defines MLD capabilities using the Enhanced Multi-Link (EML) Capabilities, the MLD Capabilities and Operations, and the Extended MLD Capabilities and Operations subfields. These subfields can be included in a Multi-Link element, a data structure that carries information related to an MLD and its affiliated STAs.

MLD capabilities can be updated after the non-AP STA MLD is associated to the AP MLD, and communicating the updated MLD capabilities between MLDs may be necessary for correct or otherwise preferred operation of the MLDs (e.g., for communication between the MLDs). Multi-link reconfiguration is a set of procedures for dynamically adding links to and deleting links from the setup links of a non-AP MLD without requiring (re)association between the peer MLDs. A non-AP MLD can update the EML capabilities subfield and the MLD Capabilities and Operations subfield when performing an add link operation by including the subfields in a Reconfiguration Multi-Link element in a Link Reconfiguration Request frame sent to add a link. However, updating the Extended MLD Capabilities and Operations subfield is not currently possible when performing an add link operation.

Updating the Extended MLD Capabilities and Operations subfield is required to enable a non-AP MLD to provide all updated MLD level capabilities to an AP MLD during an add link operation, and the non-AP MLD would therefore be required to reassociate to the AP MLD to update any MLD capabilities that would be indicated in the Extended MLD Capabilities and Operations subfield. Enabling updating of the Extended MLD Capabilities and Operations subfield during an add link operation is thus desirable or otherwise necessary to enable a non-AP MLD to dynamically update all MLD capabilities as part of an add link operation without needing to reassociate.

FIGS. 1A, 1B, 1C, 1D, and 1E collectively form FIG. 1, a block diagram of an operating environment 100 for signaling MLD capabilities. The operating environment 100 includes an AP MLD 102, and the AP MLD 102 includes two affiliated STAs, the APs 104 (e.g., AP1 104 and AP2 104). The operating environment also includes a non-AP MLD 110, and the non-AP MLD 110 includes two affiliated non-AP STAs 112 (e.g., non-AP STA1 112 and non-AP STA2 112). The AP MLD 102 and/or the non-AP MLD 110 can include a different number of affiliated STAs in other embodiments.

The AP MLD 102 may have a MLD MAC address, and the two affiliated APs 104 may have different MAC addresses to be uniquely identified. Similarly, the non-AP MLD 110 may have a MLD MAC address, and the two affiliated non-AP STAS 112 may have different MAC addresses to be uniquely identified. In general, the MAC address of an MLD and the MAC addresses of the STAs affiliated with the MLD are all different. However, the example implementations are supported where the MLD MAC address of the AP MLD 102 may equal either one of the MAC addresses of the APs 104 and/or the MLD MAC address of the non-AP MLD 110 may equal either one of the MAC addresses of the non-AP STAs 112.

As shown in FIG. 1A, the AP MLD 102 and the non-AP MLD 110 initially have a first link 120 between AP1 104 and non-AP STA1 112. The first link 120 may be a setup link, and the first link 120 may have been added during (re)association between the AP MLD 102 and the non-AP MLD 110, link reconfiguration, or the like. In response to an indication to add a link, the non-AP MLD 110 can initiate link reconfiguration to add one or more links to the AP MLD 102. The indication can include channel conditions, traffic demand, Quality of Service (QoS) requirements, and/or the like. For example, the non-AP MLD 110 may monitor the existing links (e.g., the first link 120) and available links (e.g., a link between AP2 104 and non-AP STA2 112) to determine whether adding a link can provide better performance. The monitoring may include monitoring signal strength (e.g., Received Signal Strength Indicator (RSSI)), interference, congestion, latency, bandwidth, channel occupancy and/or the like for the exiting links and available links. The non-AP MLD 110 may also determine whether the existing links are meeting QoS requirements and/or are expected to meet future QoS requirements when determining the indication to add a link.

Figure 1B:
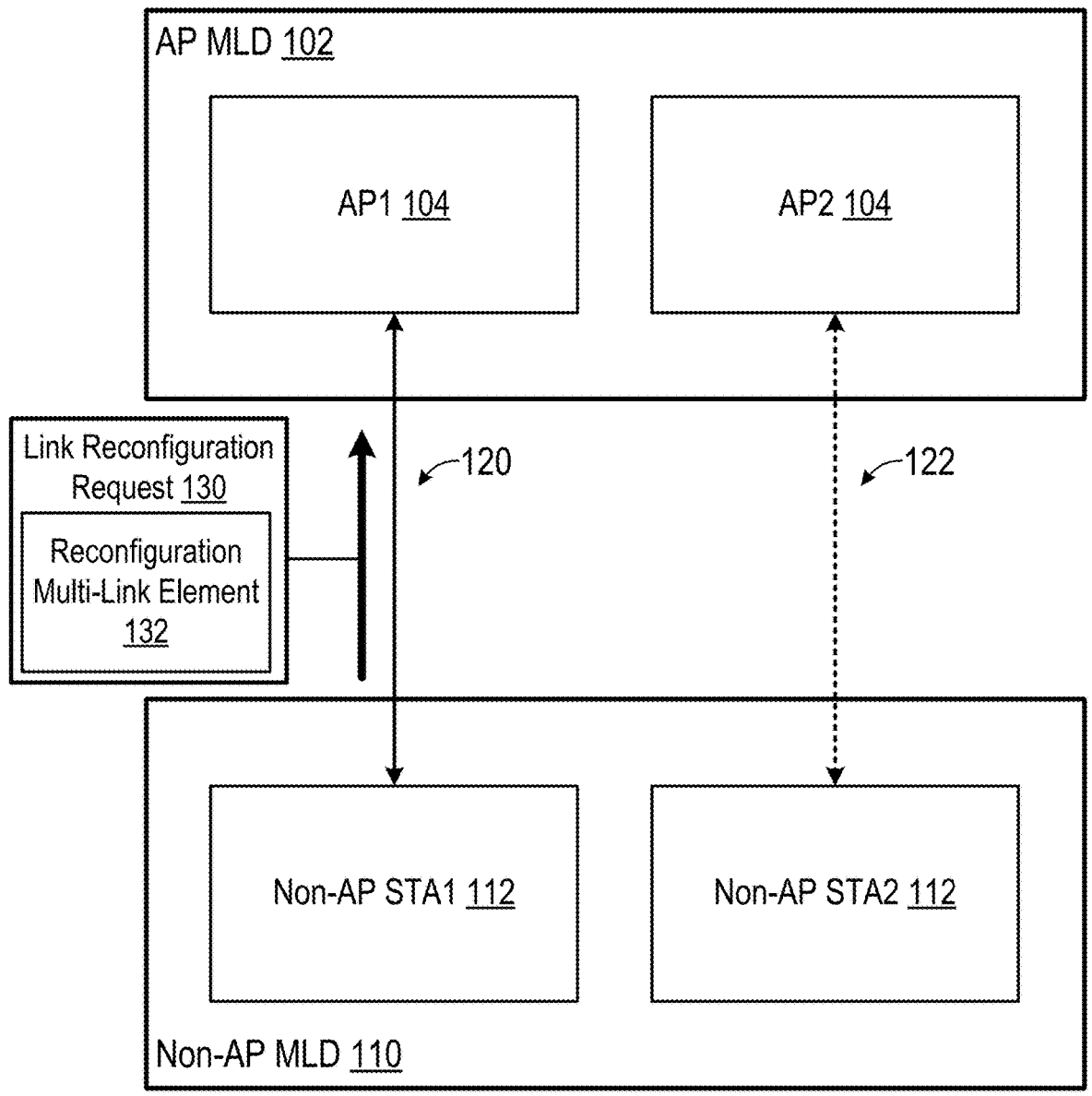

A non-AP MLD, such as the non-AP MLD 110, can use a Reconfiguration Multi-Link element to initiate a Multi-Link reconfiguration operation for adding or deleting links to its existing ML setup. Therefore, when the non-AP MLD 110 determines to add a link, the non-AP MLD 110 can generate and send to the AP MLD 102 a Link Reconfiguration Request frame 130 comprising a Reconfiguration Multi-Link element 132 as shown in FIG. 1B. In certain embodiments, the Link Reconfiguration Request frame 130 comprises a Category field set to Protected Extremely High Throughput (EHT), a Protected EHT Action field indicating a Link Reconfiguration Request, a Dialog Token field set to a nonzero value chosen by the non-AP MLD 110, the Reconfiguration Multi-Link element 132, and, optionally, an Operating Channel Information (OCI) element field. The non-AP MLD 110 can send the Link Reconfiguration Request frame 130 via an existing link (i.e., the first link 120). In the illustrated example, the non-AP MLD 110 is requesting to add a second link 122 between AP2 104 and non-AP STA2 112.

The Reconfiguration Multi-Link element 132 can include an EML subfield, a MLD Capabilities and Operations subfield, and/or an Extended MLD Capabilities and Operations subfield. Thus, the non-AP MLD 110 can update all MLD capabilities during the add link operation. Existing standards do not allow inclusion of the Extended MLD Capabilities and Operations subfield. However, the Presence Bitmap subfield and the Common Info field of the Reconfiguration Multi-Link element 132 are modified herein to enable inclusion of the Extended MLD Capabilities and Operations subfield in the Reconfiguration Multi-Link element 132, as described in further detail with respect to FIGS. 2-3.

Existing standards require the non-AP MLD 110 to always include the EML subfield and the MLD Capabilities and Operations subfield in the Reconfiguration Multi-Link element 132. The add link operation is optimized as described herein by enabling the EML subfield, the MLD Capabilities and Operations subfield, and the Extended MLD Capabilities and Operations subfield to only be included in the Reconfiguration Multi-Link element 132 if the associated MLD capabilities are updated (e.g., updated after the last (re)association). For example, if only MLD capabilities associated with the MLD Capabilities and Operations subfield changed since the last (Re)Association Request/Response exchange or other communication including the MLD capabilities, the non-AP MLD 110 can include the MLD Capabilities and Operations subfield updated to indicate the changes in the Reconfiguration Multi-Link element 132. Accordingly, the non-AP MLD 110 only includes the EML subfield, the MLD Capabilities and Operations subfield, and/or the Extended MLD Capabilities and Operations subfield when there are changes to the respective MLD capabilities and does not unnecessarily repeat the same MLD capabilities the AP MLD 102 has already received, reducing the transmission of redundant information and reducing signaling overhead of the add link operation.

If the AP MLD 102 accepts the link addition requested via the Link Reconfiguration Request frame 130, the AP MLD 102 can update the MLD capabilities (i.e., MLD capabilities and operations, the extended MLD capabilities and operations, and/or the EML capabilities) for that non-AP MLD (e.g., the non-AP MLD 110) to the values received, if any, in the Link Reconfiguration Request frame 130. For example, if the Link Reconfiguration Request frame 130 includes the EML capabilities subfield and the Extended MLD Capabilities and Operations subfield, the AP MLD 102 may update the associated MLD capabilities according to the information in the two subfields. When one or more of the subfields is not included in the Link Reconfiguration Request frame 130, the AP MLD 102 may not update these parameters and continue to use the last accepted MLD capabilities for the non-AP MLD 110 associated with each subfield not included in the Link Reconfiguration Request frame 130.

Figure 1C:
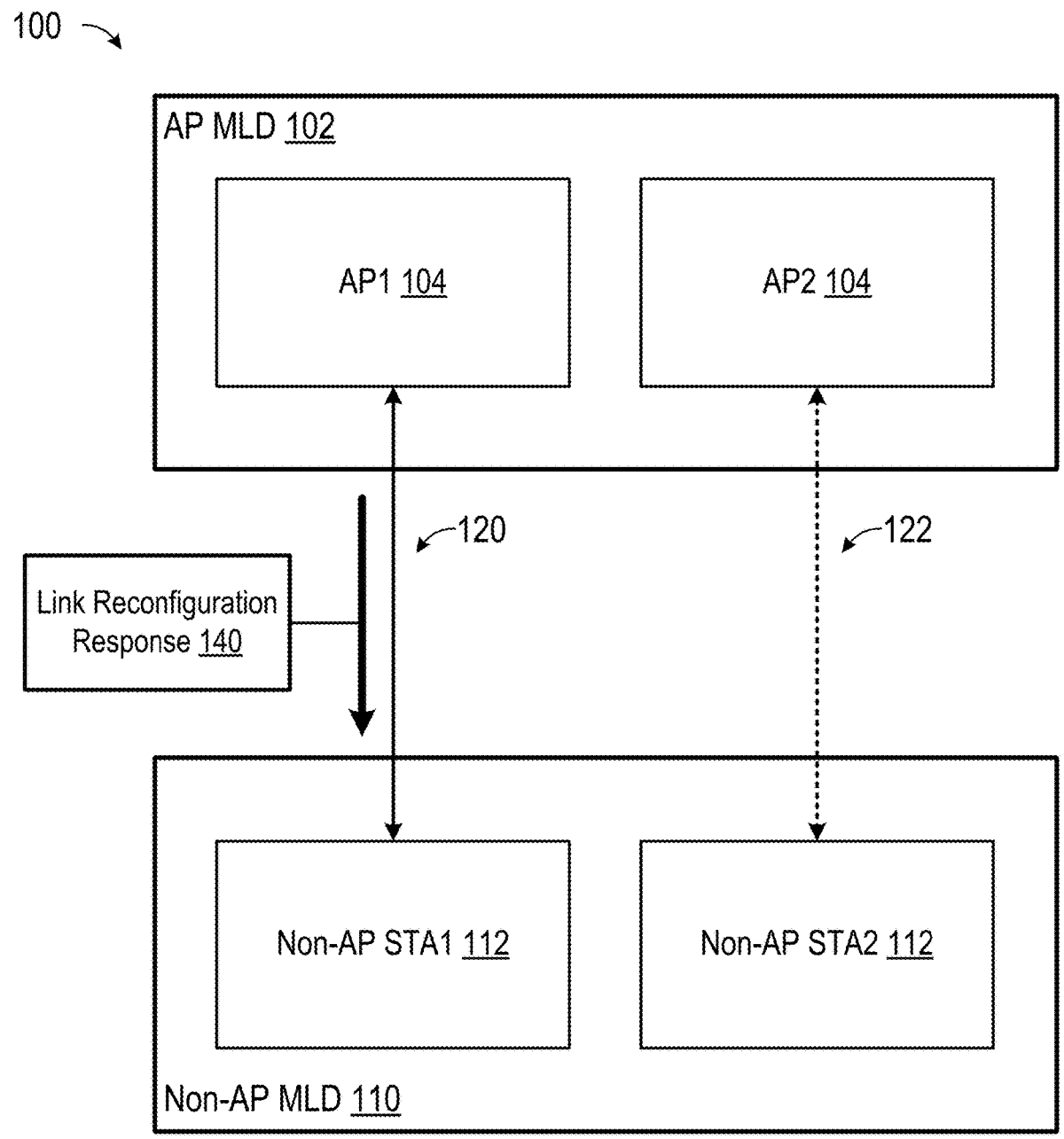

After receiving the Link Reconfiguration Request frame 130 from the non-AP MLD 110, the AP MLD 102 can respond with a Link Reconfiguration Response frame 140 as shown in FIG. 1C, after validation if required and/or required conditions are met as described below. In certain embodiments, the Link Reconfiguration Response frame 140 comprises a Category field set to Protected EHT, a Protected EHT Action field indicating a Link Reconfiguration Response, a Dialog Token field set to the value of the Dialog Token field from the Link Reconfiguration Request frame 130, a Count subfield set to the number reconfiguration status duple in a Reconfiguration Status List subfield, the Reconfiguration Status List subfield containing one or more reconfiguration status duple, an optional Group Key Data field containing group keys for the links successfully added, an optional OCI element subfield present if the Group Key Data subfield is included and containing an OCI element, and a Basic Multi-Link element to provide Per-STA Profile information for one or more APs corresponding to the successfully added links to the ML setup of the non-AP MLD 110, if at least one link addition was accepted by the AP MLD 102.

Figure 1D:
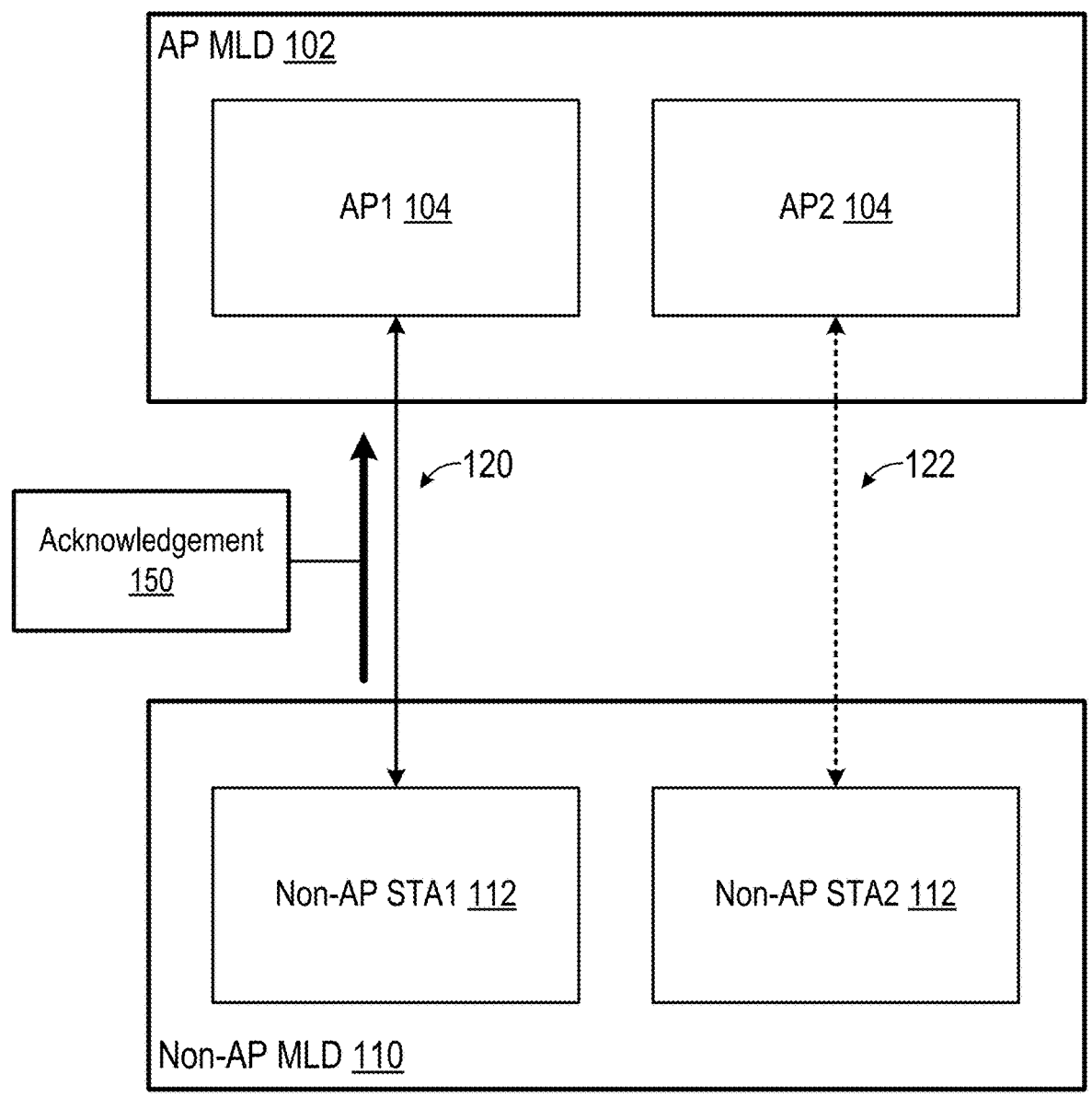
Figure 1E:
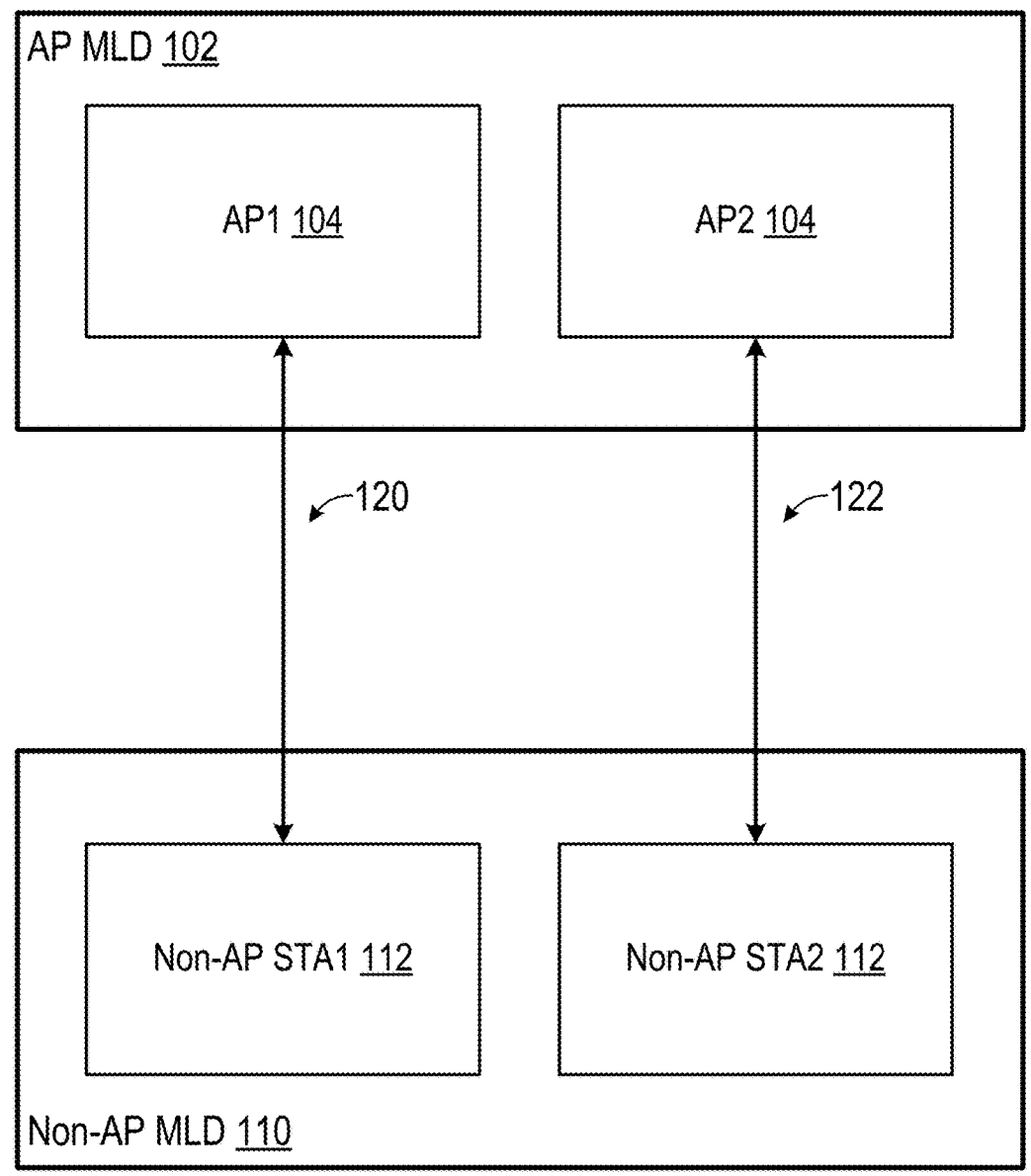

The AP MLD 102 can send the Link Reconfiguration Response frame 140 on the same link where the corresponding Link Reconfiguration Request frame 130 was received. Thus, the AP MLD 102 sends the Link Reconfiguration Response frame 140 via the first link 120. Once the non-AP MLD 110 receives the Link Reconfiguration Response frame 140 indicating a success to add the link, the non-AP MLD 110 can send an acknowledgement 150 to the AP MLD 102 as shown in FIG. 1D and add the second link 122 to its list of setup links. When the AP MLD 102 receives the acknowledgement 150, the AP MLD 102 can add the second link 122 to the list of setup links of the non-AP MLD 110. The non-AP MLD 110 can then begin using the added second link 122 as shown in FIG. 1E.

The AP MLD 102 may send the Link Reconfiguration Response frame 140 (i) when no OCI element validation is required, or (ii) when OCI element validation is required and the validation is successful. For example, when the non-AP MLD 110 is indicating to add one or more links, the non-AP MLD 110 can include an OCI element subfield in the Link Reconfiguration Request frame 130 to provide OCI for the current channel where the Link Reconfiguration Request frame 130 is being transmitted (the channel associated with the first link 120 in the illustrated example) if (i) dot11RSNAOperatingChannelValidationActivated is true for the non-AP MLD 110, (ii) the Robust Security Network Element (RSNE) in last (Re)Association Request frame transmitted to the AP MLD 102 indicated Operating Channel Validation Capable (OCVC), and (iii) the RSNE in the Beacon frame of the AP corresponding to the current link (i.e., AP1 104) indicates OCVC. After receiving the Link Reconfiguration Request frame 130 indicating a request for adding one or more links from the non-AP STA affiliated with the non-AP MLD 110 (i.e., non-AP STA1 112) that indicated OCVC in its RSNE, and if the RSNE for the affiliated AP (i.e., AP1 104) also indicates OCVC, the AP MLD 102 can validate the OCI element received in the Link Reconfiguration Request frame 130 by ensuring that the OCI element is present and the Channel information in the OCI element matches current operating channel parameters. The AP MLD 102 may then accept the request to add the link and send the Link Reconfiguration Response frame 140. However, if the OCI element is not present and/or the Channel information does not match current operating channel parameters, the AP MLD 102 may reject the request by discarding the Link Reconfiguration Request frame 130.

The AP MLD 102 may also reject the add link request if any of the following conditions are true: (i) the non-AP STA affiliated with the non-AP MLD 110 (i.e., non-AP STA2 112) corresponding to the link (i.e., the second link 122) does not support all of the rates in the BSSBasicRateSet parameter and all of the membership selectors in the BSSMembershipSelectorSet parameter of the AP affiliated with the AP MLD 102 corresponding to the link in the MAC Layer Management Entity (MLME)-START.request primitive (i.e., AP2 104); (ii) the non-AP STA affiliated with the non-AP MLD 110 corresponding to the link does not support all of the Modulation Coding Schemes (MCSs) in the Basic High Throughput (HT)-MCS Set field of the HT Operation parameter of the AP affiliated with the AP MLD 102 corresponding to the link in the MLME-START.request primitive; (iii) the non-AP STA affiliated with the non-AP MLD 110 corresponding to the link does not support all of the <Very HT (VHT)-MCS, Network Security Services (NSS)> tuples indicated by the Basic VHT-MCS And NSS Set field of the VHT Operation parameter of the AP affiliated with the AP MLD 102 corresponding to the link in the MLME-START.request primitive; (iv) the non-AP STA affiliated with the non-AP MLD 110 corresponding to the link does not support all of the <High Efficiency (HE)-MCS, NSS> tuples indicated by the Basic HE-MCS And NSS Set field of the HE Operation parameter of the AP affiliated with the AP MLD 102 corresponding to the link in the MLME-START.request primitive; (v) the non-AP STA affiliated with the non-AP MLD 110 corresponding to the link does not support all of the <EHT-MCS, NSS> tuples indicated by the Basic EHT-MCS And NSS Set field of the EHT Operation parameter of the AP affiliated with the AP MLD 102 corresponding to the link in the MLME-START.request primitive; and (vi) the non-AP STA affiliated with the non-AP MLD 110 corresponding to that link has the same MAC address as another non-AP STA associated with the AP affiliated with the AP MLD 102 corresponding to the link.

In the Link Reconfiguration Response frame 140, the AP MLD 102 can include one or more Reconfiguration Status Duple subfields with each subfield corresponding to a link ID indicated in the Per-STA Profile subelements of the corresponding Link Reconfiguration Request frame 130. In embodiments, the Reconfiguration Multi-Link element 132 includes a Per-STA Profile subelement for each affiliated non-AP STA that the non-AP MLD 110 is requesting to add to its setup links (e.g., non-AP STA2 112 in the illustrated example). When the non-AP MLD 110 is indicating to add a link, the non-AP MLD 110 can set the fields in the Per-STA Profile subelement as follows: (i) setting the Link ID subfield to the link identifier of the AP affiliated with the associated AP MLD that is operating on the link that the non-AP MLD is requesting to add (e.g., AP2 104 when adding the second link 122 in the illustrated example); (ii) setting the Complete Profile subfield and the STA MAC Address Present subfield to one; (iii) setting the AP Removal Timer Present subfield to zero; (iv) setting the Reconfiguration Operation Type subfield to two; setting the Operation Parameters Present subfield to zero; (v) setting the NSTR Bitmap Size subfield to indicate the size of the NSTR Indication Bitmap subfield; (vi) setting the NSTR Indication Bitmap Present subfield shall be set to one if at least one NSTR link pair is present for the non-AP MLD that contains the link corresponding to the link ID, otherwise zero; (vii) setting the STA MAC Address subfield in the STA Info field to the MAC address of the non-AP STA that will operate on the link which is requested to be added and indicated by the link ID (e.g., non-AP STA2 112 when adding the second link 122); (ix) if the NSTR Indication Bitmap Present subfield is set to one, setting the NSTR Indication Bitmap subfield in the STA Info field to indicate STR or NSTR for each pair of links formed between the link corresponding to the link ID and other setup links for the non-AP MLD, by setting the corresponding bit to 0 or 1; (x) setting the STA Profile field to include the complete profile for the corresponding non-AP STA identified by the STA MAC Address, including all the elements and fields that would be included in the STA Profile field for that non-AP STA in a Reassociation Request frame that includes the corresponding non-AP STA as a reported STA in the Basic Multi-Link element, except no inheritance is applied and all the applicable elements and fields are included in the STA Profile field itself.

If the AP MLD 102 accepts an add link request for a link ID (e.g., the link ID of AP2 104), the AP MLD 102 can set the corresponding Status subfield to success in the Reconfiguration Status Duple subfield, and set the Status Code field included in the STA Profile subfield of the Per-STA Profile subelement corresponding to that link ID in the Basic Multi-Link element in the Link Reconfiguration Response frame 140 to success.

In certain embodiments, if the AP MLD 102 accepts link addition for one or more links (e.g., accepting the addition of the second link 122), the AP MLD 102 includes a Group Key Data subfield in the Link Reconfiguration Response frame 140 when using the Robust Security Network (RSN). For each added link, the AP MLD 102 includes an MLO GTK KDE, an MLO IGTK KDE, and an MLO BIGTK KDE in the Group Key Data subfield providing group keys for the added link identified by the Link ID subfield (e.g., the second link 122). Further, the AP MLD 102 includes an OCI element subfield in the Link Reconfiguration Response frame 140 to provide operating channel information for the current channel where the Link Reconfiguration Response frame 140 is being transmitted if (i) dot11RSNAOperatingChannelValidationActivated is true for the AP MLD 102, (ii) the RSNE in last (Re)Association Request frame received from the non-AP MLD 110 indicated OCVC, and (iii) the RSNE in the Beacon frame of the AP corresponding to the current link indicates OCVC.

If the AP MLD 102 accepts link addition for one or more links, the Link Reconfiguration Response frame 140 may include a Basic Multi-Link element that includes the Common Info field and one Per-STA Profile subelement for each AP (i.e., AP2 104) operating on the link that is accepted by the AP MLD 102 (i.e., the second link 122) for addition to the setup links of the non-AP MLD 110. For each Per-STA Profile subelement included in the Basic Multi-Link element, the Complete Profile subfield in the STA Control field shall be set to one, and the STA Profile field corresponding to that AP shall be complete and consist of all the elements and fields that would be included in the STA Profile field for that AP in a Reassociation Response frame that includes the corresponding AP as a reported AP in the Basic Multi-Link element, except no inheritance is applied and all the applicable elements and fields are included in the STA Profile field itself. If the AP MLD 102 rejects an add link request for a Link ID, the AP MLD 102 may set the corresponding Status subfield in the Reconfiguration Status Duple subfield to indicate an appropriate rejection status code.

In embodiments when the Link Reconfiguration Response frame 140 includes a Group Key Data subfield, the AP (e.g., AP1 104) indicated OCVC in its RSNE, and the receiving non-AP STA (e.g., non-AP STA1 112) RSNE also indicates OCVC, the non-AP MLD 110 can validate the OCI element received in the Link Reconfiguration Response frame 140 by ensuring that the OCI element is present and the Channel information in the OCI element matches current operating channel parameters. The non-AP MLD 110 can accept the Link Reconfiguration Response frame 140 if the OCI element is present and the Channel information matches. Otherwise, the non-AP MLD 110 discards the Link Reconfiguration Response frame 140.

When the non-AP MLD 110 accepts the Link Reconfiguration Response frame 140 indicating success (e.g., for the second link 122), the non-AP MLD 110 can send an acknowledgement for the Link Reconfiguration Response frame 140 to the AP MLD 102 and add the link to the setup links of the non-AP MLD 110. Once the AP MLD 102 receives the acknowledgement, the AP MLD 102 can then add the link (e.g., the second link 122) to the setup links of the non-AP MLD 110.

The elements described above of the operating environment 100 (e.g., the AP MLD 102, the APs 104, the non-AP MLD 110, the non-AP STAs 112, etc.) may be practiced in hardware, in software (including firmware, resident software, micro-code, etc.), in a combination of hardware and software, or in any other circuits or systems. The elements of the operating environment 100 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-A-Chip (SOC), etc.), a circuit utilizing a microprocessor, or on a single chip containing electronic elements or microprocessors. Furthermore, the elements of the operating environment 100 may also be practiced using other technologies capable of performing logical operations such as, for example, AND, OR, and NOT, including but not limited to, mechanical, optical, fluidic, and quantum technologies. As described in greater detail below with respect to FIGS. 6 and 7, the elements of the operating environment 100 may be practiced in a computing device 600 and/or communications device 700.

FIG. 2 is a block diagram of a Presence Bitmap subfield 200 of the Reconfiguration Multi-Link element 132. The Presence Bitmap subfield 200 indicates the presence of subfields in the Common Info field 300 of the Reconfiguration Multi-Link element 132 illustrated by FIG. 3, a block diagram of the Common Info field 300 of the Reconfiguration Multi-Link element 132. Thus, a STA affiliated with an MLD that receives a frame carrying a Multi-Link element shall determine the presence of subfields carried in the Common Info field 300 based on the subfields of the Presence Bitmap subfield 200. For example, AP1 104 receives the Link Reconfiguration Request frame 130 comprising the Reconfiguration Multi-Link element 132 and determines the subfields included in the Common Info field 300 based on the Presence Bitmap subfield 200.

The Presence Bitmap subfield 200 includes a MLD MAC Address Present subfield 202, an EML Capabilities Present subfield 204, a MLD Capabilities and Operations Present subfield 206, an Extended MLD Capabilities and Operations Present subfield 208, and a reserved subfield 210. In certain embodiments, the MLD MAC Address Present subfield 202, an EML Capabilities Present subfield 204, a MLD Capabilities and Operations Present subfield 206, an Extended MLD Capabilities and Operations Present subfield 208 each comprise one bit able to be set to indicate the presence of a respective subfield or set to indicate the absence of the respective subfield. The reserved subfield 210 may be utilized for other operations and subfields, such as additional MLD capabilities subfields in further example implementations. The Common Info field 300 includes a Common Info Length subfield 302, a MLD MAC Address subfield 304, an EML Capabilities subfield 306, a MLD Capabilities and Operations subfield 308, and/or an Extended MLD Capabilities and Operations subfield 310.

The Common Info Length subfield 302 indicates the number of octets in the Common Info field 300, including one octet for the Common Info Length subfield 302. When included, the MLD MAC Address subfield 304, the EML Capabilities subfield 306, the MLD Capabilities and Operations subfield 308, and the Extended MLD Capabilities and Operations subfield 310 may each be two octets. The MLD MAC Address subfield 304 specifies the MAC Address of the MLD described by the Reconfiguration Multi-Link element 132 (e.g., the MAC address of the non-AP MLD 110 when the non-AP MLD 110 is sending the Link Reconfiguration Request frame 130).

The EML Capabilities subfield 306 contains one or more subfield used to advertise the capabilities of the MLD (e.g., the non-AP MLD 110) for Enhanced Multi-Link Single-Radio (EMLSR) operation and Enhanced Multi-Link Multiple-Radio (EMLMR) operation. For example, the EML Capabilities subfield 306 comprises an EMLSR Support subfield indicating whether the non-AP MLD 110 supports EMLSR operation, a EMLSR/EMLMR Padding Delay indicating the minimum MAC padding duration of the initial Control frame requested by the non-AP MLD 110, a EMLSR/EMLMR Transition Delay subfield indicating the transition delay time needed by the non-AP MLD 110 to switch from exchanging Physical Layer Protocol Data Units (PPDUs) on an enabled link to the listening operation on the enabled link, a EMLMR Support subfield indicating whether the non-AP MLD 110 supports EMLMR operation, a Transition Timeout subfield indicating the timeout value for EML Operating Mode Notification frame exchange in EMLMR mode and EMLSR mode, and/or the like. The non-AP MLD 110 can include the EML capabilities subfield 306 when there are one or more changes to the EML capabilities.

The MLD Capabilities and Operations subfield 308 contains one or more subfields to indicate the MLD capabilities and operations of the MLD (e.g., the non-AP MLD 110). For example, the MLD Capabilities and Operations subfield 308 can include a maximum number of simultaneous links subfield indicating the maximum number of affiliated STAs of the MLD that support simultaneous transmission or reception of frames minus one, a Single Response Scheduling (SRS) Support subfield indicating whether the MLD can receive frames with an SRS Control subfield, a Traffic Identifier (TID)-To-Link Mapping Negotiation Support subfield, a Frequency Separation for STR/AP MLD Type Indication subfield, an AP Assistance Request (AAR) Support subfield, a Link Reconfiguration Operation Support subfield, an Aligned Target Wake Time (TWT) Support subfield, and/or the like. The non-AP MLD 110 can include the MLD Capabilities and Operations subfield 308 when there are one or more changes to the MLD capabilities and operations.

The Extended MLD Capabilities and Operations subfield 310 contains one or more subfields to indicate the extended MLD capabilities and operations of the MLD (e.g., the non-AP MLD 110). For example, the Extended MLD Capabilities and Operations subfield 310 can include an Operation Parameter Update Support subfield, a Recommended Max Simultaneous Links subfield, a NSTR Status Update Support subfield, an EMLSR Enablement On One Link Support subfield, a BSS Transition Management (BTM) MLD Recommendation for Multiple APs Support subfield, and/or the like. The non-AP MLD 110 can include the Extended MLD Capabilities And Operations subfield 310 when there are one or more changes to the extended MLD capabilities and operations.

In embodiments, the MLD MAC Address Present subfield 202 is set to one if the MLD MAC Address subfield 304 is present in the Common Info field 300 and set to one if the MLD MAC Address subfield 304 is not present in the Common Info field 300. The EML Capabilities Present subfield 204 is set to one if the EML Capabilities subfield 306 is present in the Common Info field 300 and set to zero if the EML Capabilities subfield 306 is not present in the Common Info field 300. The MLD Capabilities and Operations Present subfield 206 is set to one if the MLD Capabilities and Operations subfield 308 is present in the Common Info field 300 and set to zero if the MLD Capabilities and Operations subfield 308 is not present in the Common Info field 300. The Extended MLD Capabilities and Operations Present subfield 208 is set to one if the Extended MLD Capabilities and Operations subfield 310 is present in the Common Info field 300 and is set to zero if the Extended MLD Capabilities and Operations subfield 310 is not present in the Common Info field 300. Thus, when the non-AP MLD 110 is requesting to add a link via the Link Reconfiguration Request frame 130, the non-AP MLD 110 may update the EML capabilities by setting the EML Capabilities Present subfield 204 to one and including the EML capabilities subfield 306 in the Common Info field 300, update the MLD capabilities and operations by setting the MLD Capabilities and Operations Present subfield 206 to one and including the MLD Capabilities and Operations subfield 308 in the Common Info field 300, and/or setting the Extended MLD Capabilities and Operations Present subfield 208 to one and including the Extended MLD Capabilities and Operations subfield 310 in the Common Info field 300.

Figure 4:
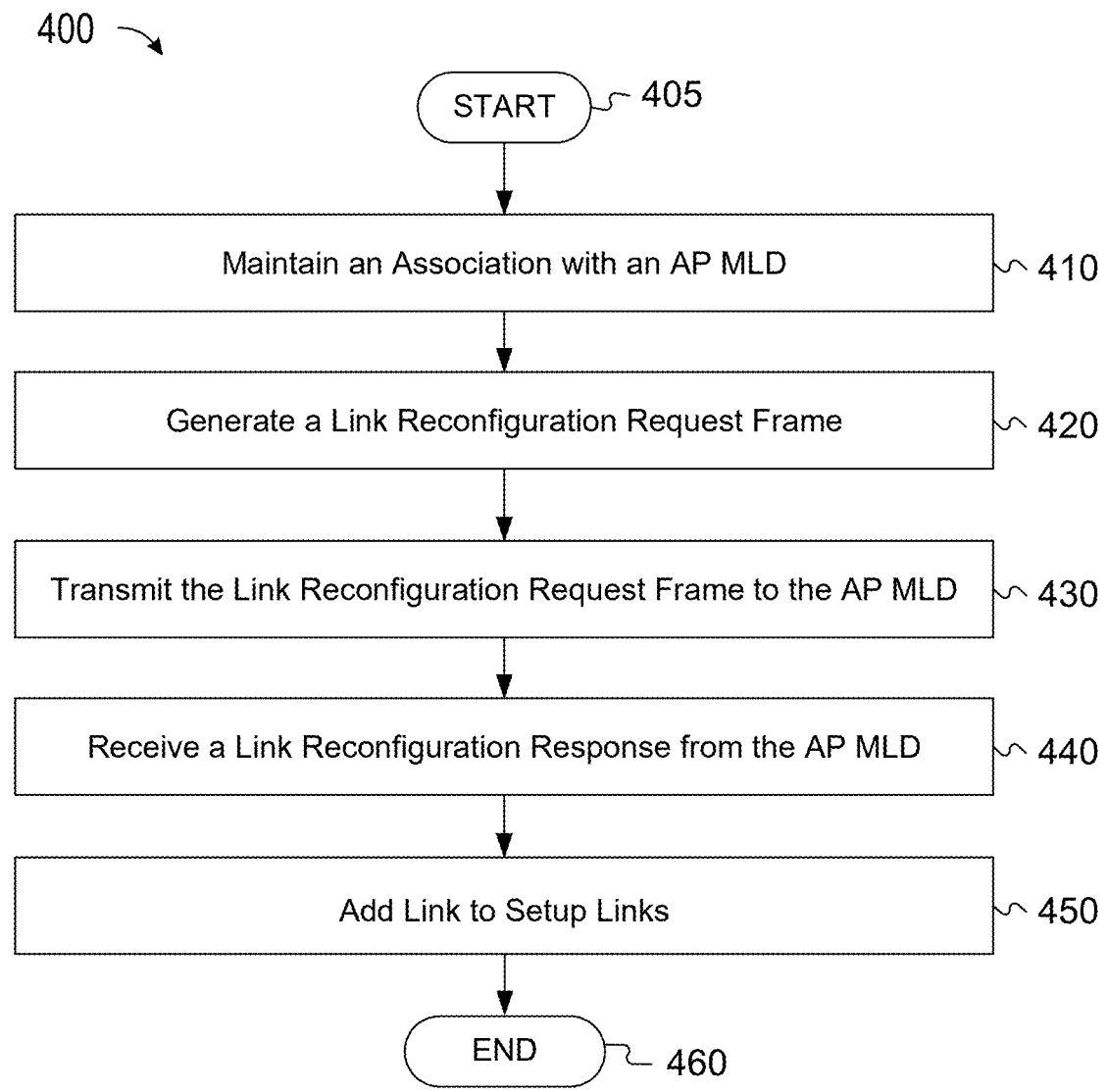
FIG. 4 is a flow chart of a method for signaling MLD capabilities by a non-Access Point (AP) MLD in accordance with aspects of the present disclosure.

FIG. 4 is a flow chart of a method 400 for signaling MLD capabilities by a non-AP MLD. The method 400 will be described as performed by the non-AP MLD 110 signaling MLD capabilities to the AP MLD 102, but any non-AP MLD may perform the method 400 to signal MLD capabilities to any AP MLD. The method 400 may begin at starting block 405 and proceed to operation 410. In operation 410, the non-AP MLD 110 maintains an association with the AP MLD 102. The association can comprise one or more setup links between the non-AP MLD 110 and the AP MLD 102, each setup link established between an affiliated non-AP station (STA) of the non-AP MLD and an affiliated AP of the AP MLD. For example, the association comprises the first link 120 between non-AP STA1 112 and AP1 104.

In operation 420, the non-AP MLD 110 generates a link reconfiguration request frame (e.g., the Link Reconfiguration Request frame 130 comprising the Reconfiguration Multi-Link element 132). For example, the non-AP MLD 110 may generate the Link Reconfiguration Request frame 130 in response to an indication (e.g., based on channel conditions, traffic demand, QoS requirements, etc.) to add a link as described above. The Reconfiguration Multi-Link element 132 can include a Per-STA Profile subelement including data for a first affiliated non-AP STA corresponding to the first link that the non-AP MLD 110 is requesting to add to the one or more setup links, as described above with respect to FIG. 1-3 for example. When the non-AP MLD 110 is requesting to add the second link 122, the Per-STA Profile subelement includes data for non-AP STA2 112.

The non-AP MLD 110 may identify whether MLD capabilities, including EML capabilities, MLD capabilities and operations, and/or extended EML capabilities and operations, are updated (e.g., since the last (re)association or other communication sending the MLD capabilities to the AP MLD 102). If any MLD capabilities are updated, the non-AP MLD 110 will set the EML Capabilities Present subfield 204, the MLD Capabilities and Operations Present subfield 206, and the Extended MLD Capabilities and Operations Present subfield 208 to the correct values to indicate which subfields are included in the Common Info field 300 and include zero or more of the EML Capabilities subfield 306, the MLD Capabilities and Operations subfield 308, and/or the Extended MLD Capabilities and Operations subfield 310 in the Common Info field 300, for example as described above with respect to FIGS. 1-3. Thus, the non-AP MLD 110 will include the EML Capabilities subfield 306, the MLD Capabilities and Operations subfield 308, and/or the Extended MLD Capabilities and Operations subfield 310 in the Reconfiguration Multi-Link element 132 only if the associated MLD capabilities are updated.

In certain embodiments, the non-AP MLD 110 determines the MLD capabilities and operations, and the extended EML capabilities and operations are updates. Thus, the non-AP MLD 110 sets the EML Capabilities Present subfield 204 to zero, the MLD Capabilities and Operations Present subfield 206 to one, and the Extended MLD Capabilities and Operations Present subfield 208 to one to indicate the presence of the MLD Capabilities and Operations subfield 308, and the Extended MLD Capabilities and Operations subfield 310 in the Common Info field 300. The MLD Capabilities and Operations subfield 308 can indicate a first set of capabilities of the non-AP MLD 110 (e.g., the MLD capabilities and operations), and the Extended MLD Capabilities and Operations subfield 310 can indicate a second set of capabilities of the non-AP MLD 110 (e.g., the extended MLD capabilities and operations). Thus, the MLD Capabilities and Operations subfield 308 is included in the Reconfiguration Multi-Link element 132 in response to a change in the first set of capabilities, and the Extended MLD Capabilities and Operations subfield 310 is included in the Reconfiguration Multi-Link element 132 in response to a change in the second set of capabilities.

The Link Reconfiguration Request frame 130 can be generated and include any components as described above with respect to FIGS. 1-3. For example, the Link Reconfiguration Request frame 130 can include a MAC address of the affiliated non-AP STA corresponding to the link being added (e.g., non-AP STA2 112). In certain embodiments, the Reconfiguration Multi-Link element 132 comprises the Presence Bitmap subfield 200 indicating the inclusion of the MLD Capabilities and Operations subfield 308 and/or the Extended MLD Capabilities and Operations subfield 310.

In operation 430, the non-AP MLD 110 transmits the Link Reconfiguration Request frame 130 to the AP MLD 102. For example, the non-AP MLD 110 transmits the Link Reconfiguration Request frame 130 to the AP MLD 102 via the first link 120. In operation 440, the non-AP MLD 110 receives a link reconfiguration response frame (e.g., a Link Reconfiguration Response frame 140) from the AP MLD 102. The Link Reconfiguration Response frame 140 can indicate a success to add the link. The Link Reconfiguration Response frame 140 can be generated and include any components as described above with respect to FIGS. 1-3. In certain embodiments, the non-AP MLD 110 can authenticate or otherwise determine whether to accept the Link Reconfiguration Response frame 140, for example by ensuring that the OCI element is present and the Channel information in the OCI element matches current operating channel parameters. In operation 450, the non-AP MLD 110 adds the link (e.g., the second link 122) to the one or more setup links of the association between the non-AP MLD 110 and the AP MLD 102.

The non-AP MLD 110 may also send an acknowledgement 150 to the AP MLD 102, and the AP MLD 102 may add the link to the one or more setup links of the association between the non-AP MLD 110 and the AP MLD 102 in response to receiving the acknowledgement 150. In some embodiments, the non-AP MLD 110 can implement the second set of capabilities (e.g., the extended MLD capabilities and operations) in response to the Link Reconfiguration Response frame 140 indicating the success. The second set of capabilities can comprise one or more of the extended MLD capabilities and operations described above with respect to FIGS. 1-3, such as support for operation parameter update negotiation, a maximum number of enabled links for the association, support for NSTR status update procedure, support for receiving a BTM Request frame with a neighbor report element including recommended links for the association, and/or the like. The method 400 can conclude at ending block 460.

Figure 5:
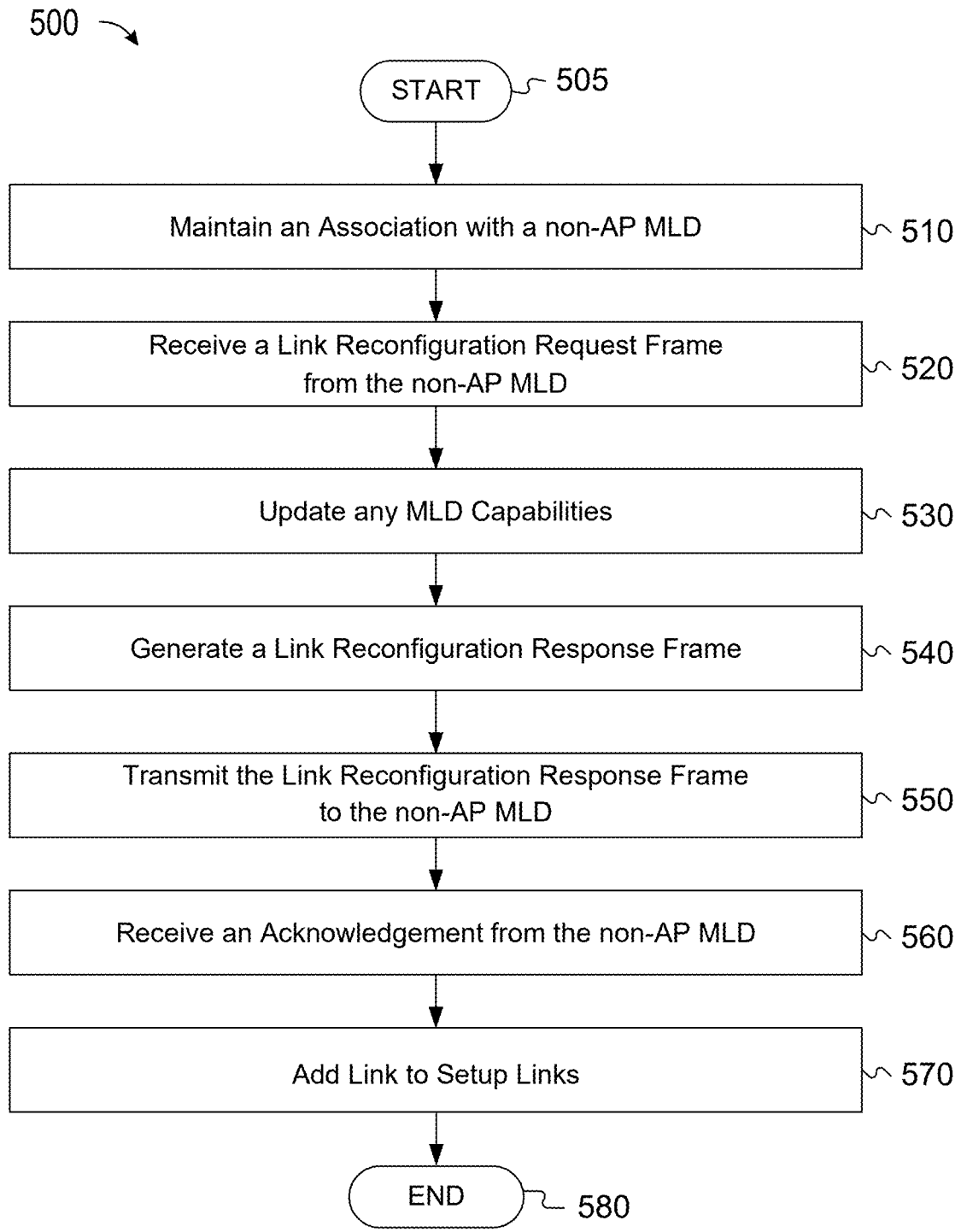
FIG. 5 is a flow chart of a method for receiving MLD capabilities by an AP MLD in accordance with aspects of the present disclosure.

FIG. 5 is a flow chart of a method 500 for receiving MLD capabilities by an AP MLD. The method 500 will be described as performed by the AP MLD 102 receiving MLD capabilities from the non-AP MLD 110, but any AP MLD may perform the method 500 to receive MLD capabilities from any non-AP MLD. The method 500 may begin at starting block 505 and proceed to operation 510. In operation 510, the AP MLD 102 maintains an association with the non-AP MLD 110. The association can comprise one or more setup links between the non-AP MLD 110 and the AP MLD 102, each setup link established between an affiliated non-AP station (STA) of the non-AP MLD and an affiliated AP of the AP MLD. For example, the association comprises the first link 120 between non-AP STA1 112 and AP1 104.

In operation 520, the AP MLD 102 receives a Link Reconfiguration Request frame 130 from the non-AP MLD 110 requesting to add a link (e.g., the second link 122). The Link Reconfiguration Request frame 130 can include any components as described above with respect to FIGS. 1-4. For example, the Link Reconfiguration Request frame 130 can include zero or more of the EML Capabilities subfield 306, the MLD Capabilities and Operations subfield 308, and/or the Extended MLD Capabilities and Operations subfield 310. In certain embodiments, the AP MLD 102 can authenticate or otherwise determine whether to accept the Link Reconfiguration Request frame 130, for example by ensuring that the OCI element is present and the Channel information in the OCI element matches current operating channel parameters.

In operation 530, the AP MLD 102 updates any MLD capabilities for the non-AP MLD 110. For example, the AP MLD 102 identifies whether any of the EML Capabilities subfield 306, the MLD Capabilities and Operations subfield 308, and/or the Extended MLD Capabilities and Operations subfield 310 are present and updates the MLD capabilities using the information in any present subfields. The AP MLD 102 can then implement any necessary changes in operation, such as enforcing the updated capabilities.

In operation 540, the AP MLD 102 generates a Link Reconfiguration Response frame 140, for example in response to determining to accept the Link Reconfiguration Request frame 130 and add the link. The Link Reconfiguration Response frame 140 can indicate a success to add the link. The Link Reconfiguration Response frame 140 can be generated and include any components as described above with respect to FIGS. 1-3. In operation 540, the AP MLD 102 transmits the Link Reconfiguration Response frame 140 to the non-AP MLD 110, for example using the first link 120.

In operation 560, the AP MLD 102 receives an acknowledgement 150 from the non-AP MLD 110 indicating the non-AP MLD 110 acknowledges the acceptance and is adding the link to the one or more setup links of the association between the non-AP MLD 110 and the AP MLD 102. In operation 570, the AP MLD 102 adds the link to the one or more setup links of the association between the non-AP MLD 110 and the AP MLD 102, for example in response to the acknowledgement 150. The method 500 can conclude at ending block 580.

Figure 6:
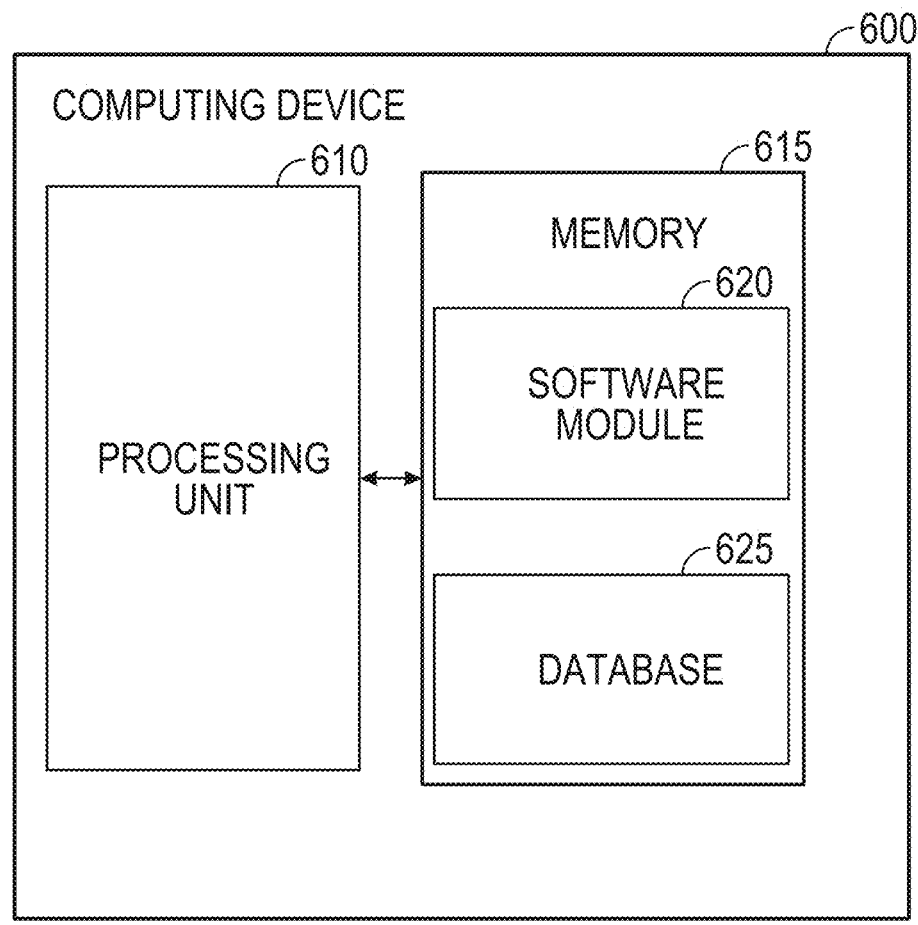
FIG. 6 is a block diagram of a computing device in accordance with aspects of the present disclosure.

FIG. 6 is a block diagram of a computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for signaling MLD capabilities with respect to FIGS. 1-5. Computing device 600, for example, may provide an operating environment for the AP MLD 102, the APs 104, the non-AP MLD 110, the non-AP STAs 112, and the like. The AP MLD 102, the APs 104, the non-AP MLD 110, the non-AP STAs 112, and the like may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples, and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Figure 7:
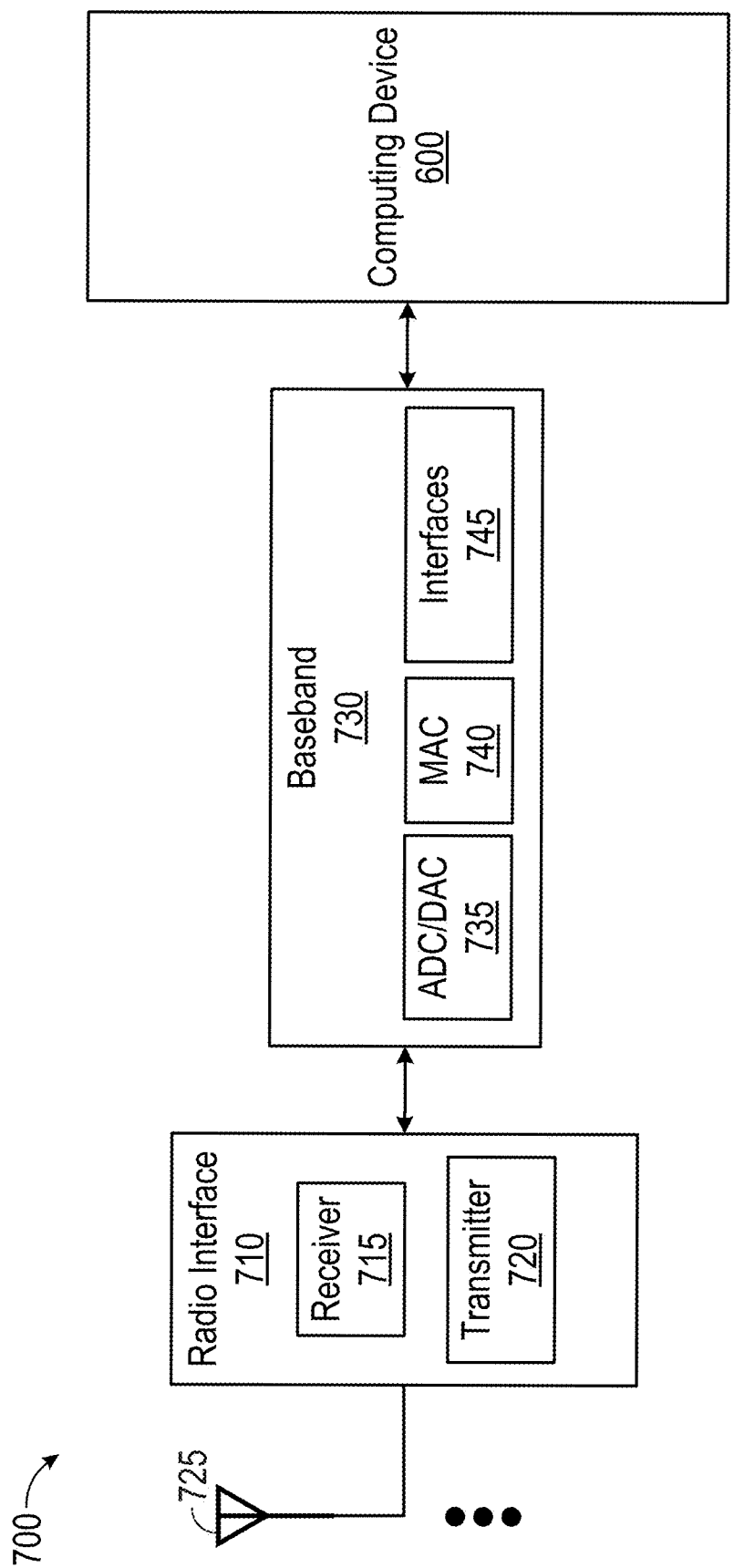
FIG. 7 is a block diagram of a computing device in accordance with aspects of the present disclosure.

FIG. 7 illustrates an implementation of a communications device 700 that may implement one or more of the AP MLD 102, the APs 104, the non-AP MLD 110, the non-AP STAs 112, etc., of FIGS. 1-5. In various implementations, the communications device 700 may comprise a logic circuit. The logic circuit may include physical circuits to perform operations described for one or more of the AP MLD 102, the APs 104, the non-AP MLD 110, the non-AP STAs 112, etc., of FIGS. 1-5, for example. As shown in FIG. 7, the communications device 700 may include one or more of, but is not limited to, a radio interface 710, baseband circuitry 730, and/or the computing device 600.

The communications device 700 may implement some or all of the structures and/or operations for the AP MLD 102, the APs 104, the non-AP MLD 110, the non-AP STAs 112, etc., of FIGS. 1-5, storage medium, and logic circuit in a single computing entity, such as entirely within a single device. Alternatively, the communications device 700 may distribute portions of the structure and/or operations using a distributed system architecture, such as a client station server architecture, a peer-to-peer architecture, a master-slave architecture, etc.

A radio interface 710, which may also include an Analog Front End (AFE), may include a component or combination of components adapted for transmitting and/or receiving single-carrier or multi-carrier modulated signals (e.g., including Complementary Code Keying (CCK), Orthogonal Frequency Division Multiplexing (OFDM), and/or Single-Carrier Frequency Division Multiple Access (SC-FDMA) symbols), although the configurations are not limited to any specific interface or modulation scheme. The radio interface 710 may include, for example, a receiver 715 and/or a transmitter 720. The radio interface 710 may include bias controls, a crystal oscillator, and/or one or more antennas 725. In additional or alternative configurations, the radio interface 710 may use oscillators and/or one or more filters, as desired.

The baseband circuitry 730 may communicate with the radio interface 710 to process, receive, and/or transmit signals and may include, for example, an Analog-To-Digital Converter (ADC) for down converting received signals with a Digital-To-Analog Converter (DAC) 735 for up converting signals for transmission. Further, the baseband circuitry 730 may include a baseband or Physical (PHY) layer processing circuit for the PHY link layer processing of respective receive/transmit signals. Baseband circuitry 730 may include, for example, a MAC processing circuit 740 for MAC/data link layer processing. Baseband circuitry 730 may include a memory controller for communicating with MAC processing circuit 740 and/or a computing device 600, for example, via one or more interfaces 745.

In some configurations, PHY processing circuit may include a frame construction and/or detection module, in combination with additional circuitry such as a buffer memory, to construct and/or deconstruct communication frames. Alternatively or in addition, MAC processing circuit 740 may share processing for certain of these functions or perform these processes independent of PHY processing circuit. In some configurations, MAC and PHY processing may be integrated into a single circuit.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:
1. A method comprising:
maintaining, by a non-access point (AP) multi-link device (MLD), an association with an AP MLD, the association comprising one or more setup links between the non-AP MLD and the AP MLD, each setup link established between an affiliated non-AP station (STA) of the non-AP MLD and an affiliated AP of the AP MLD;

responsive at least to an indication to add a first link to the one or more setup links of the association:
    generating, by the non-AP MLD, a link reconfiguration request frame,
        wherein the link reconfiguration request frame comprises a reconfiguration multi-link element, the reconfiguration multi-link element including a per-STA profile subelement including data for a first affiliated non-AP STA corresponding to the first link that the non-AP MLD is requesting to add to the one or more setup links;
        wherein the reconfiguration multi-link element further comprises a MLD Capabilities and Operations subfield comprising data indicating a first set of capabilities of the non-AP MLD, and an Extended MLD Capabilities and Operations subfield comprising data indicating a second set of capabilities of the non-AP MLD;
    transmitting, by the non-AP MLD, the link reconfiguration request frame to the AP MLD using a link of the one or more setup links;
    receiving a link reconfiguration response frame from the AP MLD; and
    responsive to the link reconfiguration response frame indicating a success, adding the first link to the one or more setup links of the association between the AP MLD and the non-AP MLD.

2. The method of claim 1, wherein the link reconfiguration request frame includes a medium access control (MAC) address of the first affiliated non-AP STA corresponding to the first link.

3. The method of claim 1, wherein the Extended MLD Capabilities and Operations subfield is included in the reconfiguration multi-link element in response to a change in the second set of capabilities of the non-AP MLD.

4. The method of claim 1, wherein the reconfiguration multi-link element further comprises a presence bitmap subfield including one or more bits indicating inclusion of the MLD Capabilities and Operations subfield.

5. The method of claim 1, wherein the reconfiguration multi-link element further comprises a presence bitmap subfield including one or more bits indicating inclusion of the Extended MLD Capabilities and Operations subfield.

6. The method of claim 1, further comprising implementing the second set of capabilities responsive to the link reconfiguration response frame indicating the success.

7. The method of claim 1, wherein the second set of capabilities comprises one or more of support for operation parameter update negotiation, a maximum number of enabled links for the association, support for Nonsimultaneous Transmit and Receive (NSTR) status update procedure, and support for receiving a Basic Service Set Transition Management (BTM) Request frame with a neighbor report element including recommended links for the association.

8. A non-access point (AP) multi-link device (MLD), comprising:
    at least one memory element for storing data; and
    at least one processor for executing instructions associated with the data, wherein executing the instructions causes the non-AP MLD to perform operations, comprising:
        maintaining an association with an AP MLD, the association comprising one or more setup links between the non-AP MLD and the AP MLD, each setup link established between an affiliated non-AP station (STA) of the non-AP MLD and an affiliated AP of the AP MLD;
        responsive at least to an indication to add a first link to the one or more setup links of the association:
            generating, by the non-AP MLD, a link reconfiguration request frame,
                wherein the link reconfiguration request frame comprises a reconfiguration multi-link element, the reconfiguration multi-link element including a per-STA profile subelement including data for a first affiliated non-AP STA corresponding to the first link that the non-AP MLD is requesting to add to the one or more setup links;
                wherein the reconfiguration multi-link element further comprises a MLD Capabilities and Operations subfield comprising data indicating a first set of capabilities of the non-AP MLD, and an Extended MLD Capabilities and Operations subfield comprising data indicating a second set of capabilities of the non-AP MLD;
            transmitting, by the non-AP MLD, the link reconfiguration request frame to the AP MLD using a link of the one or more setup links;
            receiving a link reconfiguration response frame from the AP MLD; and
            responsive to the link reconfiguration response frame indicating a success, adding the first link to the one or more setup links of the association between the AP MLD and the non-AP MLD.

9. The non-AP MLD of claim 8, wherein the reconfiguration multi-link element includes a medium access control (MAC) address of the first affiliated non-AP STA corresponding to the first link.

10. The non-AP MLD of claim 8, wherein the Extended MLD Capabilities and Operations subfield is included in the reconfiguration multi-link element in response to a change in the second set of capabilities of the non-AP MLD.

11. The non-AP MLD of claim 8, wherein the reconfiguration multi-link element further comprises a presence bitmap subfield including one or more bits indicating inclusion of the MLD Capabilities and Operations subfield.

12. The non-AP MLD of claim 8, wherein the reconfiguration multi-link element further comprises a presence bitmap subfield including one or more bits indicating inclusion of the Extended MLD Capabilities and Operations subfield.

13. The non-AP MLD of claim 8, the operations further comprising implementing the second set of capabilities responsive to the link reconfiguration response frame indicating the success.

14. The non-AP MLD of claim 8, wherein the second set of capabilities comprises one or more of support for operation parameter update negotiation, a maximum number of enabled links for the association, support for Nonsimultaneous Transmit and Receive (NSTR) status update procedure, and support for receiving a Basic Service Set Transition Management (BTM) Request frame with a neighbor report element including recommended links for the association.

15. A non-transitory computer-readable storage medium having stored therein instructions which, when executed by a processor, cause the processor to perform operations, the operations comprising:
    maintaining an association with an access point (AP) MLD, the association comprising one or more setup links between a non-AP MLD and the AP MLD, each setup link established between an affiliated non-AP station (STA) of the non-AP MLD and an affiliated AP of the AP MLD;

responsive at least to an indication to add a first link to the one or more setup links of the association:

generating, by the non-AP MLD, a link reconfiguration request frame, wherein the link reconfiguration request frame comprises a reconfiguration multi-link element, the reconfiguration multi-link element including a per-STA profile subelement including data for a first affiliated non-AP STA corresponding to the first link that the non-AP MLD is requesting to add to the one or more setup links;

wherein the reconfiguration multi-link element further comprises a MLD Capabilities and Operations subfield comprising data indicating a first set of capabilities of the non-AP MLD, and an Extended MLD Capabilities and Operations subfield comprising data indicating a second set of capabilities of the non-AP MLD;

transmitting, by the non-AP MLD, the link reconfiguration request frame to the AP MLD using a link of the one or more setup links;

receiving a link reconfiguration response frame from the AP MLD; and responsive to the link reconfiguration response frame indicating a success, adding the first link to the one or more setup links of the association between the AP MLD and the non-AP MLD.

16. The non-transitory computer-readable storage medium of claim 15, wherein the reconfiguration multi-link element includes a medium access control (MAC) address of the first affiliated non-AP STA corresponding to the first link.

17. The non-transitory computer-readable storage medium of claim 15, wherein the Extended MLD Capabilities and Operations subfield is included in the reconfiguration multi-link element in response to a change in the second set of capabilities of the non-AP MLD.

18. The non-transitory computer-readable storage medium of claim 15, wherein the reconfiguration multi-link element further comprises a presence bitmap subfield including one or more bits indicating inclusion of the MLD Capabilities and Operations subfield.

19. The non-transitory computer-readable storage medium of claim 15, wherein the reconfiguration multi-link element further comprises a presence bitmap subfield including one or more bits indicating inclusion of the Extended MLD Capabilities and Operations subfield.

20. The non-transitory computer-readable storage medium of claim 15, the operations further comprising implementing the second set of capabilities responsive to the link reconfiguration response frame indicating the success.

21. The non-transitory computer-readable storage medium of claim 15, wherein the second set of capabilities comprises one or more of support for operation parameter update negotiation, a maximum number of enabled links for the association, support for Nonsimultaneous Transmit and Receive (NSTR) status update procedure, and support for receiving a Basic Service Set Transition Management (BTM) Request frame with a neighbor report element including recommended links for the association.

* * * * *